US011215382B2

(12) United States Patent
Heyl et al.

(10) Patent No.: US 11,215,382 B2
(45) Date of Patent: Jan. 4, 2022

(54) MOTOR VEHICLE COOLING DEVICE WITH SEVERAL EVAPORATORS OF DIFFERENT COOLING CAPACITY

(71) Applicant: Hanon Systems, Daejeon (KR)

(72) Inventors: Peter Heyl, Cologne (DE); Felix Girmscheid, Cologne (DE)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/249,272

(22) Filed: Jan. 16, 2019

(65) Prior Publication Data

US 2019/0226723 A1    Jul. 25, 2019

(30) Foreign Application Priority Data

Jan. 24, 2018    (DE) .................... 102018101514.3

(51) Int. Cl.
| | |
|---|---|
| F25B 5/02 | (2006.01) |
| F25B 1/10 | (2006.01) |
| B60H 1/00 | (2006.01) |
| F25B 49/02 | (2006.01) |
| B60H 1/32 | (2006.01) |
| F25B 41/20 | (2021.01) |

(52) U.S. Cl.
CPC ............ *F25B 5/02* (2013.01); *B60H 1/00278* (2013.01); *B60H 1/323* (2013.01); *F25B 1/10* (2013.01); *F25B 41/20* (2021.01); *F25B 49/02* (2013.01); *B60H 2001/00307* (2013.01); *F25B 2600/2519* (2013.01)

(58) Field of Classification Search
CPC ........ F25B 5/02; B60H 1/00278; B60H 1/323
See application file for complete search history.

(56) References Cited

U.S. PATENT DOCUMENTS 3,664,150 A  *  5/1972  Patterson .................. F25B 5/02
                                                    62/234
4,596,123 A  *  6/1986  Cooperman .......... F25B 29/003
                                                    62/199

(Continued)

FOREIGN PATENT DOCUMENTS

| DE | 10001470 A1 | 7/2001 |
| DE | 10313850 A1 | 10/2004 |

(Continued)

*Primary Examiner* — Jonathan Bradford
(74) *Attorney, Agent, or Firm* — Norton Rose Fulbright US LLP; James R. Crawford

(57) ABSTRACT

A motor vehicle chiller with several evaporators of different cooling capacity, has a refrigerant circulation with at least one refrigerant compressor, at least one condenser, at least one expansion element as well as at least two evaporators disposed in parallel of different cooling capacity. A refrigerant collector is disposed downstream of the expansion element and upstream of the evaporator of lesser cooling capacity to separate liquid refrigerant. Between the refrigerant collector and the evaporator a refrigerant pump is disposed to convey the liquid refrigerant to the evaporator of lesser cooling capacity. The refrigerant vapor can be guided from the evaporator across the refrigerant collector functioning as a separator and be drawn in by the refrigerant compressor.

20 Claims, 1 Drawing Sheet

(56) References Cited

U.S. PATENT DOCUMENTS

| | | | | |
|---|---|---|---|---|
| 5,007,247 A | * | 4/1991 | Danig | F25B 41/00 |
| | | | | 62/174 |
| 2004/0123624 A1 | * | 7/2004 | Ohta | F25B 5/02 |
| | | | | 62/498 |
| 2009/0317697 A1 | | 12/2009 | Dogariu et al. | |
| 2015/0118538 A1 | * | 4/2015 | Haussmann | F25B 5/02 |
| | | | | 429/120 |
| 2015/0283874 A1 | * | 10/2015 | Seitz | B60H 1/00278 |
| | | | | 62/118 |
| 2016/0010898 A1 | * | 1/2016 | Takeuchi | F25B 5/02 |
| | | | | 62/498 |

FOREIGN PATENT DOCUMENTS

| | | |
|---|---|---|
| DE | 102017100591 B3 | 5/2018 |
| EP | 2933584 A1 | 10/2015 |
| JP | H04257660 A | 9/1992 |
| JP | H09196478 A | 7/1997 |
| JP | 2005326139 A | 11/2005 |
| JP | 2012111486 A | 6/2012 |
| KR | 100339128 B1 | 6/2002 |
| KR | 20150063930 A | 6/2015 |
| KR | 20160046262 A | 4/2016 |
| WO | 2013125006 A1 | 8/2013 |

* cited by examiner

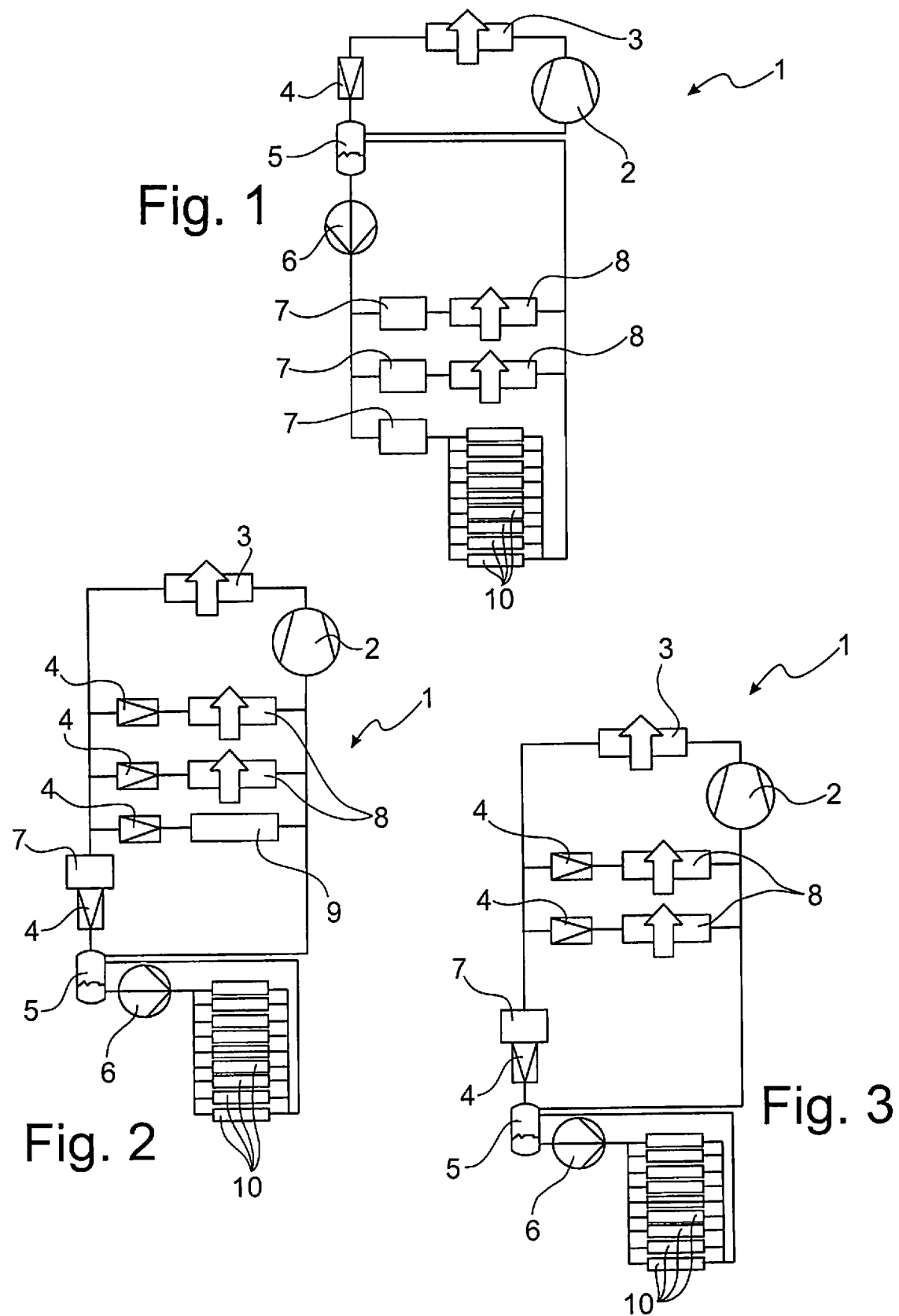

MOTOR VEHICLE COOLING DEVICE WITH SEVERAL EVAPORATORS OF DIFFERENT COOLING CAPACITY

This Application claims priority from German Patent Application No. 102018101514.3 filed on Jan. 24, 2018 in Germany, which is hereby incorporated by reference in its entirety.

The invention relates to a motor vehicle cooling device (also referred to herein as a chiller), that operates several evaporators of different cooling capacity in a refrigerant circulation.

The requirements made of motor vehicle chillers are manifold and these devices must be conceptualized correspondingly flexibly in their application. Apart from the classic application field of air conditioning the passenger compartment, motor vehicle chillers for electric or hybrid vehicles must, in particular, also optimally cool electric and electronic components in order to ensure their optimal unhindered and uninterrupted operation.

In comparison to conventional refrigerant circulations, refrigerant circulations for motor vehicles with high and flexibly controllable cooling capacity are consequently required in order for the refrigerant circulation to be applicable to vehicles with electric or hybrid drive. One particularity in generic refrigerant circulations consists therein that especially with electric or hybrid vehicles in order to reach optimal conditions during driving operation and during battery or accumulator charging, cooling the battery or the accumulator and the electronic components is required as well as additionally cooling the motor vehicle interior compartment for conditioning the air. Especially the need for a rapid charging of the batteries leads to special demands made of the chiller of the motor vehicle since the optimal charge of the batteries depends on the cooling of the batteries during the charging process. There is also a particularity of the application field in that the individual cooling capacities for the various tasks are very different. The evaporators are accordingly laid out and constructed differently.

In prior art refrigerant circulations for vehicles with electric or hybrid drive are known in the most diverse implementations.

For example, in prior art US 2009/0317697 A1 discloses a chiller for a motor vehicle with a bypass, that is suitable for providing battery cooling by means of a battery cooler.

DE 103 13 850 A1 discloses furthermore a refrigerant circulation especially for motor vehicles that comprises a two-stage compression for the combined chiller and heat pump operation. In this refrigerant circulation two series connected compressors are provided which realize a two-stage compression, wherein the circulation is additionally optimized for the purpose of being able to realize also a heat pump operation of the overall device.

The invention now addresses the problem of providing a refrigerant circulation in particular for motor vehicles with electric or hybrid drive which, in addition to the tasks of cold production for conditioning the air of the motor vehicle passenger compartment, is also suitable for optimally supplying the batteries as well as the electronic components in driving mode as well as also in battery-charging mode with cold.

The problem is resolved through a subject matter with the characteristics according to the present invention described herein.

The problem is particularly resolved through a motor vehicle chiller with several evaporators of different cooling capacity, which comprises a refrigerant circulation with at least the standard components refrigerant compressor, at least one condenser for liquifying the refrigerant, at least one expansion valve for the pressure relief of the refrigerant as well as at least two parallel disposed evaporators of different cooling capacity. According to their function, the evaporators have herein a cooling capacity that is adapted to the particular task, wherein the invention is especially directed toward optimally supplying one or several evaporators with lesser cooling capacity with liquid refrigerant. For this purpose downstream of the expansion element and upstream of the evaporator of lower cooling capacity a refrigerant collector is disposed for the separation of the liquid refrigerant. Between the refrigerant collector and the evaporator with lower cooling capacity, furthermore, a refrigerant pump is disposed for conveying the liquid refrigerant to the evaporator of lower cooling capacity. Downstream of the evaporator the refrigerant vapor is transported by means of connection lines of the refrigerant circulation out of the evaporator across the refrigerant collector, which is implemented as a separator for potentially still liquid refrigerant, and lastly to the refrigerant compressor by which the refrigerant vapor is drawn in.

It should be especially emphasized that with the interconnection of the refrigerant collector and the subsequent active conveyance of the liquid refrigerant by a refrigerant pump toward the evaporators with lower cooling capacity the stable supply of the evaporators with the lower cooling capacities becomes possible and, consequently, in the application, for example for the cooling of individual battery cells, local overheating through nonuniform supply of the evaporators with refrigerant is counteracted or is effectively excluded. Through the active conveyance of the liquid refrigerant the individual evaporators of lower cooling capacity can, if indicated, be supplied with an excess of liquid refrigerant such that a constant evaporation temperature without local overheating can be achieved over the entire evaporation surface area. At the evaporator output there is possibly still liquid refrigerant present which, however, by conducting the refrigerant across the refrigerant collector, functioning as separator, is separated from the refrigerant stream and only the refrigerant in vapor form is subsequently drawn in by the refrigerant compressor.

It is especially preferred for several evaporators with lower cooling capacity to be connected in parallel in the refrigerant circulation as battery cell coolers. The refrigerant pump supplies the parallel-connected battery cell coolers uniformly with liquid refrigerant. Evaporator modules of four to twenty or thirty individual evaporators of lower cooling capacity are preferably employed. A cooling capacity of cumulatively ten to twenty or thirty kW is herein required.

The evaporators with lower cooling capacity, for example the battery cell coolers, are herein preferably supplied with liquid refrigerant at a uniform pressure level. For this purpose, the expansion element is accordingly disposed upstream of the refrigerant collector and the liquid refrigerant, separated in the refrigerant collector, is subsequently supplied by the refrigerant pump at one pressure level for all evaporators.

The evaporators with a lower cooling capacity are advantageously implemented such that they can be isolated from the refrigerant circulation through a central shut off device. It is thereby ensured that, for example in certain operational states, the supply with refrigerant of certain regions is completely prevented in order, for example, to have a sufficient quantity of refrigerant liquid available for other tasks or to separate certain regions of the circulation in the event of an emergency.

One embodiment of the invention comprises parallel-connecting several evaporators as air coolers in the refrigerant circulation upstream of the evaporators with lower cooling capacity.

Overall, with the motor vehicle chiller cooling and air conditioning concepts can be realized which supply a multiplicity of cooling energy consumers. It is therewith for example customary to position evaporators for the air conditioning of the motor vehicle interior space as air coolers in different areas of the passenger compartment and to supply them correspondingly separately with refrigerant across a parallel connection of the evaporators.

It is especially preferred to assign discrete expansion elements to these evaporators as air coolers, whereby an optimal adaptation of the cold sources can take place to the particular required conditions in the individual areas of the passenger compartment.

Alternatively, or cumulatively, it can be of advantage to assign a separate shut-off device to each of the evaporators as air coolers in order to shut off the corresponding regions of the refrigerant circulation under certain circumstances and in this way to isolate them from a supply with refrigerant.

Especially preferred is the embodiment of a motor vehicle chiller which, apart from the evaporators as air coolers, also comprises an evaporator as a battery cooler connected in parallel in the refrigerant circulation. The battery cooler consequently serves for cooling the batteries under normal conditions of performance requirement. A circulation implemented thusly can consequently be operated in a normal mode of battery cooling by means of the battery cooler and, moreover, in a mode of maximal cooling capacity of up to 20 kW.

To the battery cooler is alternatively also assigned a discrete expansion element such that cooling the battery is also regulatable simply and inexpensively through an appropriate control.

The battery cooler is again, alternatively or cumulatively, implemented such that it can be shut off from the refrigerant circulation with a separate shut-off device.

In an especially advantageous embodiment the refrigerant compressor is implemented as a multistage compressor or several compressors are provided.

The concept of the invention comprises that a refrigerant collector is disposed upstream of a multiplicity of evaporators of any order of magnitude of cooling capacity and that the motor vehicle chiller is equipped with one or several expansion elements for a flexible adaptation of the individual evaporators.

The refrigerant pump transports the refrigerant to the different evaporators which, through the intermediate connection of the refrigerant pump, are supplied uniformly and efficiently with liquid refrigerant. Due to the high refrigerant flow in the evaporators, the refrigerant is not completely evaporated. Thereby the advantage is gained that no regions, to be cooled by the evaporators, with local overheating or higher temperatures are formed and that in the evaporator a uniform temperature is realized. This is especially advantageous in view of the application case for cooling the battery cells which are stressed by differing temperatures and impaired in their efficiency. The mixture of refrigerant vapor and refrigerant liquid flowing from the evaporators flows to the refrigerant collector, where it is segregated and the refrigerant liquid is drawn in by the refrigerant pump and again conducted to the evaporators. The refrigerant gas is supplied from the refrigerant collector functioning as separator to the refrigerant compressor or is drawn in by it.

With the support by the refrigerant pump also a better oil transport in the liquid refrigerant takes place. The saturated refrigerant gas is drawn in by the refrigerant compressor. In this way difficulties due to inhomogeneous distribution of the refrigerant liquid can also be avoided.

Of further advantage is the lesser pressure drop through the compensation of the flow losses by means of the refrigerant pump.

It is especially advantageous that different refrigerant circulations are adaptable with this system. For example, two parallel-disposed compressors with separate drawing-in for a high and a normal cooling capacity can be laid out. A compartmentation of the compression by means of a high-priced refrigerant compressor with an inverter as well as a low-priced compressor without inverter are also feasible for a constantly high capacity during the high-load phases of the refrigerant circulation.

In summary, the advantages of the invention comprise high cooling capacity, low pressure loss across the evaporators with lower cooling capacity and better refrigerant distribution to the various evaporators.

Further details, characteristics and advantages of embodiments of the invention are evident based on the following description of embodiment examples with reference to the associated drawing. Therein depict:

FIG. 1: motor vehicle chiller in the embodiment with an expansion valve,

FIG. 2: motor vehicle chiller with several evaporators and discrete pressure relief, FIG. 3: motor vehicle chiller with a multiplicity of battery cell coolers.

In FIG. 1 is shown a motor vehicle chiller as a schematic diagram, which operates with only one expansion element 4 and therewith at one evaporation temperature level for all connected evaporators 8, 10. The circulation layout comprises, first, a refrigerant compressor 2 which compresses the gaseous refrigerant to a high pressure and transports the refrigerant gas at high pressure into a condenser 3. In the condenser 3 the hot refrigerant gas is liquified at high pressure, the heat output is indicated by an arrow symbolizing an air stream. The liquified refrigerant is subsequently relieved to the evaporation pressure in the expansion element 4 and the potentially generated mixture of refrigerant vapor and refrigerant liquid is segregated in the refrigerant collector 5. The liquid refrigerant is conveyed from the refrigerant collector 5 into the refrigerant pump 6, in the diagram in the downward direction, and is actively conveyed by the refrigerant pump 6 into the circulation. Subsequent thereto are disposed in parallel two evaporators 8 as air coolers and a multiplicity of evaporators 10 as battery cell cooler. The air coolers 8 as well as the multiplicity of battery cell coolers 10 are each separable from the refrigerant circulation by a shut-off device 7 whereby good control or regulation of the device is achieved. As indicated schematically in FIG. 1 the battery cell cooling is realized by a multiplicity of evaporators of smaller capacity 10 in order to enable highly specifically and with great efficiency and uniform temperature the cooling of the individual battery cells. After the refrigerant gas has flowed in parallel through the evaporators 8, 10, it arrives again in the refrigerant collector 5 functioning as a separator, where potentially not evaporated refrigerant is separated as liquid and, across the refrigerant pump 6, is again supplied to the evaporators 8, 10 on a short path, whereas the refrigerant gas is drawn in by the refrigerant compressor 2 and is compressed whereupon the cycle is closed.

Especially advantageous is the lower pressure loss in the evaporators since only refrigerant liquid is present at the inlet of the evaporator. Thus, a more uniform distribution of the entering refrigerant can be ensured in comparison to a two-phase mixture of refrigerant vapor and refrigerant liquid. The constructional realization, moreover, is simplified, since, for example, no mixers or the like need to be employed in order to ensure a uniform distribution.

FIG. 2 shows a modification of the circulation according to FIG. 1, wherein the motor vehicle chiller 1 comprises additionally an evaporator 9 as battery cooler for normal cooling conditions of the battery. Furthermore, up to thirty small battery cell coolers are inserted in the circulation as evaporators 10. The air cooler 8 and the battery cooler 9 are each connected in parallel with a discrete expansion element 4 and integrated into the refrigerant circulation. A further parallel strand of the circulation is formed with a shut-off device 7 with discrete relief through the subsequent expansion element 4, the refrigerant collector 5, as well as the refrigerant pump 6 with the battery cell coolers 10. As previously described, the refrigerant gas from the evaporators 10 is conducted across the refrigerant collector 5 as the separator to the suction side of the refrigerant compressor 2. An advantageous aspect of this embodiment comprises that the multiplicity of smaller evaporators are disposed peripherally with respect to the other evaporators.

In FIG. 3 is depicted an embodiment of the motor vehicle chiller 1 which, in contrast to the embodiment according to FIG. 2, does not comprise a battery cooler 9 as evaporator for normal battery cooling operation. Shutting off the battery cell coolers 10, through which flow is conducted in parallel, by the shut-off device 7 is again feasible.

Inherent in the motor vehicle chillers 1 of FIGS. 1, 2 and 3 is that the condenser 3 can be implemented as air, water or combined air-and-water condenser. The condenser 3 is, in addition, constructable with a discrete collector or a supercooling surface.

The embodiment according to FIG. 1 entails the special advantage that only one expansion element is required for all evaporators 8, 10. The evaporators 8, 10, moreover, are also disposed in the proximity of the refrigerant collector 5 such that short paths and low losses are possible. In addition, it should be stated that the refrigerant can be particularly securely stored on the low-pressure side within the circulation. As a further advantage should be listed that the circulation can be complemented by an interior heat exchanger or, for example, by a work-extracting expansion technology expansion-compression unit. The employed shut-off devices are simple on/off valves which enable an especially cost-effective operation or construction of the chiller.

When using two refrigerant compressors, one compressor with inverter can be combined with a second compressor without inverter, whereby cost savings are feasible. While the high-pressure collector is feasible, it is not required and supercooling in the condenser is also realizable. Overall, a motor vehicle chiller 1 according to FIG. 1 is capable of enabling simply and effectively the refrigerant distribution onto the battery cell coolers 10.

With respect to the implementation of the condenser 3 as well as the employment of a simple one-stage refrigerant compressor 2 up to multi-stage refrigerant compressors, the specifications provided in connection with FIG. 1 also apply to FIG. 2. The refrigerant-air heat exchanger, which can also be termed air cooler 8, as well as the standard battery cooler 9 are operated with thermostatic expansion valves 4. The maximum capacity of battery cooling is achieved through the low-pressure refrigerant collector 5 and the refrigerant pump 6 of the battery cooler segment. The distribution of the refrigerant fluid onto the battery cell coolers 10 is feasible at low expenditures without an additional expansion valve. In this system an internal heat exchanger or an expansion-compression unit can be integrated into the circulation and two battery cooling systems result; for one, one for standard cooling across the battery cooler 9 and, alternatively, for the high-cooling loading through the battery cell coolers 10. As noted, up to 30 battery cell coolers 10 are required and operated.

Lastly, regarding FIG. 3 it should additionally be stated that the depicted motor vehicle chiller 1 suffices without the battery cooler 9 of the layout according to FIG. 2. The refrigerant pump 6 operates herein at a high pressure level and an overheating of the battery cooler segments does not occur due to the cooling with the separate battery cell coolers 10.

In all of the embodiment examples of FIGS. 1 to 3 the expansion elements can be implemented in any desired way, for example as orifices, as thermostatic expansion valves, as electrical expansion valves, as capillaries, as expanders or as ejectors.

Preferred refrigerants for the motor vehicle air conditioner systems are R1234yf, R152a, R290, R744, R717 or R1270.

LIST OF REFERENCE NUMBERS

1 Motor vehicle chiller
2 Refrigerant compressor
3 Condenser
4 Expansion element, thermostatic expansion valve
5 Refrigerant collector, low-pressure refrigerant collector
6 Refrigerant pump
7 Shut-off device
8 Air cooler, evaporator
9 Battery cooler, evaporator
10 Battery cell cooler, evaporator

The invention claimed is:
1. A motor vehicle chiller with several evaporators of different cooling capacity, comprising a refrigerant circulation with at least one refrigerant compressor, at least one condenser, at least one expansion element as well as at least two evaporators of different cooling capacity disposed in parallel,
wherein one of said at least two evaporators is an evaporator of lesser cooling capacity relative to the other of the at least two evaporators,
wherein downstream of the expansion element and upstream of the evaporator of lesser cooling capacity a refrigerant collector is disposed for the separation of liquid refrigerant, wherein refrigerant flows directly from the expansion element to the refrigerant collector,
wherein between downstream of the refrigerant collector and upstream of the evaporator of lesser cooling capacity a refrigerant pump is disposed for the conveyance of liquid refrigerant to the evaporator of lesser cooling capacity,
wherein refrigerant vapor exiting from the evaporator of lesser cooling capacity can be guided from the evaporator of lesser cooling capacity across the refrigerant collector as the separator and be drawn in by the refrigerant compressor, and
wherein the expansion element is disposed between the at least one condenser and the refrigerant collector.

2. The motor vehicle chiller according to claim 1, wherein several evaporators of the lesser cooling capacity are disposed in parallel as battery cell coolers in the refrigerant circulation and are supplied with liquid refrigerant by the refrigerant pump.

3. The motor vehicle chiller according to claim 1, wherein a plurality of the evaporators of the lesser cooling capacity are supplied with liquid refrigerant at one pressure level.

4. The motor vehicle chiller according to claim 1, wherein a plurality of the evaporators of the lesser cooling capacity are implemented such that they can be isolated from the refrigerant circulation through a central shut-off device.

5. The motor vehicle chiller according to claim 1, wherein a plurality of the evaporators of the lesser cooling capacity are disposed in parallel as air coolers in the refrigerant circulation upstream of the evaporators of lesser cooling capacity.

6. The motor vehicle chiller according to claim 5, wherein discrete expansion elements are assigned to the plurality of the evaporators of the lesser cooling capacity.

7. The motor vehicle chiller according to claim 5, wherein separate shut-off devices are assigned to the plurality of the evaporators of the lesser cooling capacity.

8. The motor vehicle chiller according to claim 1, further comprising an evaporator connected in parallel is disposed in the refrigerant circulation as a battery cooler.

9. The motor vehicle chiller according to claim 1, wherein a discrete expansion element is assigned to the evaporator of lesser cooling capacity.

10. The motor vehicle chiller according to claim 1, wherein a separate shut-off device is assigned to the evaporator of lesser cooling capacity.

11. The motor vehicle chiller according to claim 1, wherein the refrigerant compressor is a multi-stage compressor.

12. The motor vehicle chiller according to claim 2, wherein the several evaporators of the lesser cooling capacity are implemented such that they can be isolated from the refrigerant circulation through a central shut-off device.

13. The motor vehicle chiller according to claim 2, wherein several evaporators are disposed in parallel as air coolers in the refrigerant circulation upstream of the several evaporators of the lesser cooling capacity.

14. The motor vehicle chiller according to claim 2, wherein the several evaporators of the lesser cooling capacity are implemented such that they can be isolated from the refrigerant circulation through a central shut-off device.

15. The motor vehicle chiller according to claim 3, wherein the plurality of evaporators of the lesser cooling capacity are implemented such that they can be isolated from the refrigerant circulation through a central shut-off device.

16. The motor vehicle chiller according to claim 2, wherein several evaporators are disposed in parallel as air coolers in the refrigerant circulation upstream of the several evaporators of the lesser cooling capacity.

17. The motor vehicle chiller according to claim 3, wherein several evaporators are disposed in parallel as air coolers in the refrigerant circulation upstream of the plurality of the evaporators of the lesser cooling capacity.

18. The motor vehicle chiller according to claim 4, wherein several evaporators are disposed in parallel as air coolers in the refrigerant circulation upstream of the plurality of evaporators of the lesser cooling capacity.

19. The motor vehicle chiller according to claim 2, wherein additionally an evaporator connected in parallel is disposed in the refrigerant circulation as a battery cooler.

20. The motor vehicle chiller according to claim 3, wherein additionally an evaporator connected in parallel is disposed in the refrigerant circulation as a battery cooler.

* * * * *